United States Patent [19]

Manno

[11] Patent Number: 4,813,142
[45] Date of Patent: Mar. 21, 1989

[54] SAW ATTACHMENT FOR BACKHOE

[76] Inventor: Sam Manno, 1455 N.E. 57th Ct., Fort Lauderdale, Fla. 33334

[21] Appl. No.: 80,898

[22] Filed: Aug. 3, 1987

Related U.S. Application Data

[63] Continuation of Ser. No. 788,444, Oct. 17, 1985, abandoned.

[51] Int. Cl.⁴ .............................................. B23D 45/00
[52] U.S. Cl. .................................... 30/379.5; 144/2 Z; 144/34 R
[58] Field of Search ............... 30/379, 379.5; 144/2 Z, 144/34 R, 2 N

[56] References Cited

U.S. PATENT DOCUMENTS 2,719,549 10/1955 Hemshrodt ........................ 30/379 X
3,785,705 1/1974 Binger et al. ..................... 30/379 X
4,522,239 6/1985 Gaitten .......................... 30/379.5 X Primary Examiner—Douglas D. Watts
Attorney, Agent, or Firm—Eugene Malin

[57] ABSTRACT

Disclosed herein is a timber cutting attachment for a backhoe machine. The attachment includes a frame adapted to being connected to the arm extending from the backhoe. Attached to the frame is a blade guard and a circular blade. Within the frame of the attachment is a hydraulic motor is coupled to the hydraulic system associated with the backhoe and controlled from the cab of the backhoe to rotate the blade. The attachment is used by lowering the arm and thereby lowering the attachment while the blade is rotating so that it cuts a log on the downward motion. A fork bracket may be provided extending from the guard to allow the logs to be repositioned for cutting or removal.

2 Claims, 2 Drawing Sheets

SAW ATTACHMENT FOR BACKHOE

This is a continuation of application Ser. No. 788,444, filed Oct. 17, 1985, now abandoned.

This invention relates to an attachment adapted for being connected to a piece of construction machinery, and more particularly to a hydraulic driven circular saw attachment which may be connected to a backhoe and which is designed to cut logs laying on the ground.

Prior to constructing improvements on unimproved land, it is common that trees must be removed, particularly in and around the area of the improvement. This typically has been done by using large bulldozers to push over the trees and thereafter cutting up the fallen trees into small logs which can be lifted onto trucks for disposal. Cutting the trees, which generally is done by workmen using chain saws, presents several problems. First in order for a chain saw to be light enough for use by one or two men, the amount of powder must be limited to reduce the weight of the chain saw engine. Second, workmen using chain saws become tired very quickly and hence the amount of work which can be accomplished decreases as the day progresses. Third, the trees, when pushed down, are typically placed in a large pile and it is difficult for the workmen to move the fallen trees on top of the pile in order to gain access to the trees at the bottom of the pile. In order to cut all of trees, it is necessary to cut the trees into relatively small sized logs which can be moved away from the pile by one person, however the truck hauling away the logs can typically handle logs as large as eight feet long, and machines are commonly available to load such large logs on to the trucks.

A piece of construction equipment generally found in the construction industry is the backhoe. Typically a backhoe device has a shovel attached to an arm and is used for digging holes or trenches. The shovel may be manipulated to a variety of positions generally along a vertical plane. Typically the shovel is controlled by a hydraulic mechanism associated with the backhoe tractor which moves the arm up and down or in and out as well as rotates the shovel about the end of the arm. The shovel attachment to the backhoe is typically removable and can be replaced with other types of attachments or other types of shovels, depending on the particular job.

The backhoe is typically a mobile piece of equipment which can be moved from one place to another with relative ease. An arm and shovel may be attached to the back of a conventional tractor or in the case of larger pieces of equipment, to a track vehicle in order to create a backhoe. Typically, the mechanism forming the backhoe has support legs which can be extended to plant the backhoe mechanism firmly in place to allow the backhoe to be most effectively utilized. Such support legs may, within limits, also be used to allow the back hoe shovel to operate on an angle, if necessary.

Because of the common availability of backhoes, it would be desirable that an attachment be provided which can be attached to the backhoe arm and used to cut up the fallen timber on land being cleared. Such an attachment could use the existing hydraulic power system in the backhoe mechanism, to drive the saw. The availability of conventional hydraulic motors would allow such a saw attachment to have a large amount of power so that logs of various sizes could be easily and quickly cut. Such a saw attachment for a backhoe would also reduce the fatigue of workmen cutting the logs because the mechanism itself would be doing the heavy work, rather than the individuals.

In accordance with one aspect of this invention, there is provided a timber cutting attachment for a construction machine having a hydraulic control system associated therewith. The attachment comprises frame means for being attached to the machine and movable by the machine between a first and second position. In addition, the attachment has a hydraulic motor attached to the frame and coupled to and controlled by the hydraulic system. Finally, the attachment has a circular saw blade coupled to and rotated by the motor for cutting timber as the frame is moved from the first to the second position.

One preferred embodiment of the subject invention is hereafter described with specific reference being made to the following Figures.

DESCRIPTION OF THE PREFERRED EMBODIMENT

Figure 1:
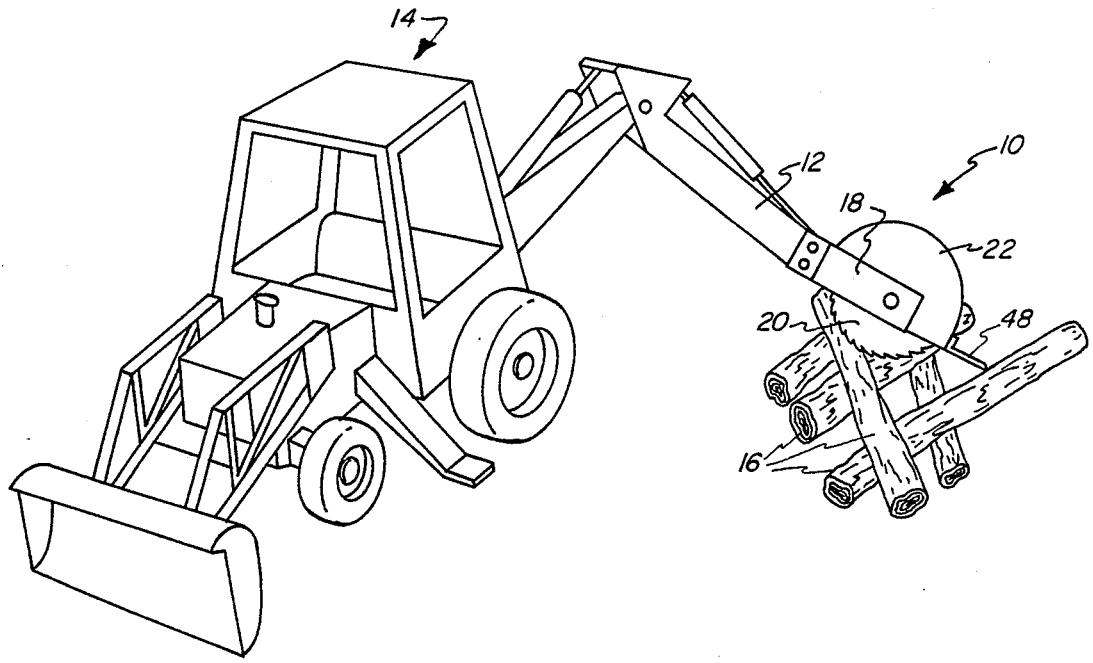
FIG. 1 shows the timber cutting attachment of the subject invention coupled to a backhoe.
Figure 2:
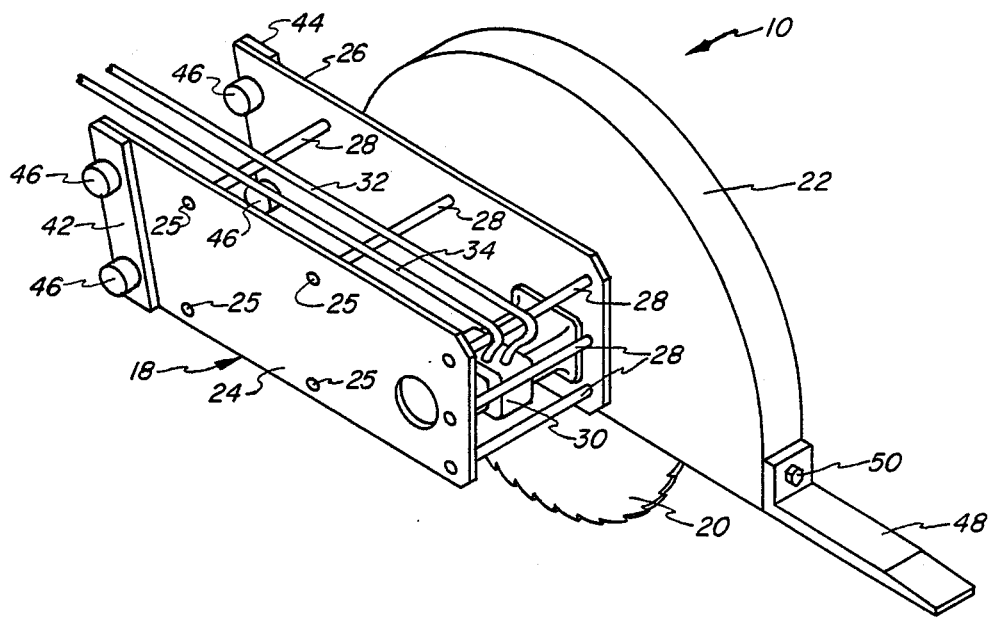
FIG. 2 is an isometric view of the timber cutting attachment of the subject invention.
Figure 3:
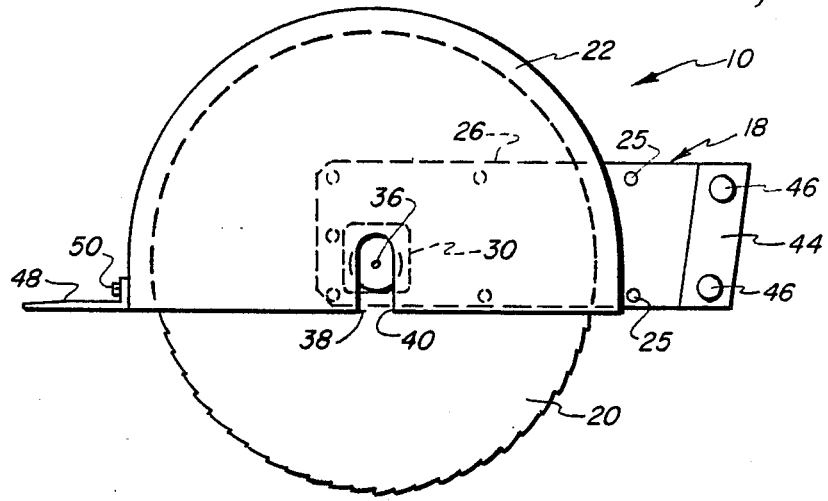
FIG. 3 is a side view from the frame side of the attachment of the subject invention.
Figure 4:
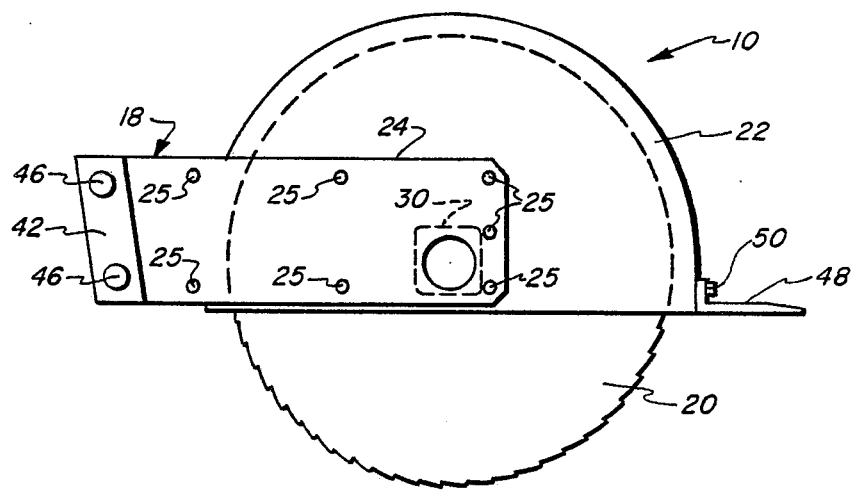
FIG. 4 is a side view from the guard side of the attachment of the subject invention.
Figure 5:
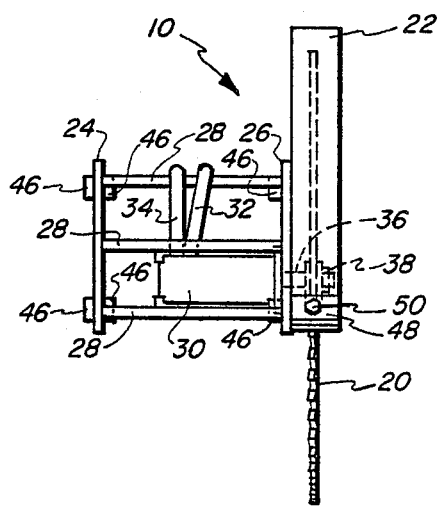
FIG. 5 is a front view of the attachment of the subject invention.

Referring now to FIG. 1, a timber cutting attachment 10 is shown connected to the movable arms 12 and 12' with hydraulic moving means 13 and 13' for movement in a generally vertical plane of a backhoe tractor 14. As is well known, the arms 12 and 12' of backhoe tractor or earth moving apparatus 14 move vertically in such a manner that attachment 10 may be moved both up or down and towards or away from backhoe tractor 14. In this movement attachment 10 can be adjusted to cut the a pile fallen timbers 16 lying generally horizontal in a haphazard fashion, shown beneath attachment 10 in FIG. 1.

Attachment 10 includes a frame 18 which is directly coupled to arm 12. In addition, attachment 10 includes a circular saw blade 20 and a blade guard 22. Guard 22 is attached to frame 18 and blade 20 is attached to a motor (not shown in FIG. 1) within frame 18. The shaft of the motor extends through one side of frame 18 and a blade 20 is attached to such shaft when positioned within guard 22. Approximately the lower half of blade 20 extends out of guard 22 and is used to cut timber 16.

Referring now to FIGS. 2 through 5, the detailed construction of timber cutting attachment 10 is shown. Frame 18 includes an outer side plate 24 and an inner side plate 26 which are secured together and separated by separator rods 28. The rods 28 may be secured by welding to side plates 24 and 26. Holes 25 within within side plates 24 and 26 may be used to position rods 28.

A hydraulic motor 30 is positioned between plates 24 and 26 and has a pair of hoses 32 and 34 extending therefrom back to the hydraulic system included within backhoe tractor 14. Hydraulic motor 30 may, for instance, be a model 35M-1C20 hydraulic motor manufactured by the Bickers Division of Sperry-Rand Corporation of Troy, Mich. Such a motor is responsive to hydraulic fluid flowing through one of the pipes 32 or 34 with the other of the pipes being a return path for such fluid. The fluid which flows through the pipes 32 and 34 and turns a shaft 36 of motor 30 in the appropriate direction. The direction of rotation may be controlled by the appropriate selection at an operator's panel within backhoe 14 of the fluid flow direction through pipes 32 and 34.

A generally semicircular blade guard 22 is attached to the outer side of inner plate 26 and positioned so that the radial center thereof is in aligmment with the shaft from motor 30. Guard 22 may be slightly greater than a semicircle and is adapted to having blade 20 fit wholly within guard 22. Blade 20 may be connected to shaft 36 and secured thereto by a nut 38 or other conventional securing mechanisms. The outer side of guard 22 includes a slot 40 adapted to allowing the nut 38 to be loosened or tightened so that blade 20 may be easily changed.

At the end of frame 18, remote from motor 30, a pair of attachment brackets 42 and 44 are provided. Attachment brackets 42 and 44 have a pair of extensions 46 which are adapted to being coupled to the backhoe arm 12 in the manner shown in FIG. 1. Extensions 46 extend through the plates 24 and 26. With this structure the backhoe arm 12 can be easily snapped on to attachment 10 so that attachment 10 is moved as the arm 12 is moved. It should be noted that other types of attachment devices conventional in the art may also be used in place of brackets 42 and 44 and extensions 46.

The size of saw blade 20 should be selected to be between 36 and 48 inches in diameter. This is to allow blade 20 to cut through the average size logs 16 in a single cut. Further, blade 20 should be large enough so that cuts at an angle to the longitudinal direction of logs 16 may be made since the logs 16 may not be level on the ground, but rather may be placed at angles due to being stacked on one another.

A fork bracket 48 may be attached to the front of guard 22 by a bolt 50. Bracket 48 is positioned to be generally parallel to the bottom of guard 22 and may extend approximately eighteen inches therefrom. Bracket 48 may be used to move the logs 16 around so that they may be conveniently cut or after they are cut so that they do not interfere with other logs 16 to be cut. Bracket 48 may also be used to lift the log to be cut onto another log so that it is above the ground. This will prevent potential damage to the teeth of blade 20 if stones are on the ground.

In order to cut logs stacked at an angle, the hydraulic foot supports associated with backhoe tractor 14 may be adjusted to tilt backhoe tractor 14 at an angle. This causes the angle of attack of attachment 10 to be at an angle rather than vertically. One may also add means to attachment 10 to allow it to be tilted and provides arm 12 with the capability of moving at an angle as well as in the vertical plane. Such angular cutting may be used to compensate for the angulor position of the logs. Also, attachment 10 can be used to move the logs 16 to gain access to those logs at the bottom of a pile, as well as to place the logs generally flat.

What is claimed is:

1. An earth removing apparatus including a first arm and a second distal arm attachable to earth moving equipment comprising:

hydraulic control and drive system means associated with said apparatus and connected to and positioned on said distal arm for vertically moving said distal arm from a first position above the earth to a second position in at least close proximity to the earth, a fallen timber cutting attachment functionally connected to said second distal arm for cutting a pile of timber on the earth, said attachment means including a frame, a hydraulic motor means, and a circular saw blade, said frame including two plates connected together, and arm connectors adjacent one end of each said plate for removable attachment to said distal arm of said apparatus and movable by said apparatus and said distal arm between at least said first position and said second position, said frame having an upper portion and a lower end portion positionable closest to the earth;

said hydraulic motor means connected to said plates of said frame, said hydraulic motor means fluidly connected to and controlled by said hydraulic system means, said hydraulic motor means removably connected to said hydraulic system; and said circular saw blade having a peripheral cutting edge, said circular saw blade being coupled to and rotated by said hydraulic motor means, said frame supporting said circular saw blade for generally vertical rotation in relation to the earth for cutting fallen timbers on the ground as said frame moves from said first position above the earth to said second position in at least close proximity to the earth supporting the timber, said circular saw blade being so supported by said frame that a lower portion of said peripheral cutting edge of said circular saw blade extends below said lower end portion of said frame, said circular saw blade is always disposed in a generally vertical position to the ground, said circular saw blade includes a guard cover, said circular saw blade having an upper vertical position and lower vertical cutting portion, said guard cover attached to said frame and positioned over said upper vertical portion;

said guard covers the upper half of said saw blade, said hydraulic motor means positioned between said plates.

2. An earth removing apparatus including a first arm and a second distal arm attachable to earth moving equipment comprising:

hydraulic control and drive system means associated with said apparatus and connected to and positioned on said distal arm for vertically moving said distal arm from a first position above the earth to a second position in at least close proximity to the earth, a fallen timber cutting attachment functionally connected to said second distal arm for cutting a pile of timber on the earth, said attachment means including a frame, a hydraulic motor means, and a circular saw blade, said frame including two plates connected together, and arm connectors adjacent one end of each said plate for removable attachment to said distal arm of said apparatus and movable by said apparatus and said distal arm between at least said first position and said second position, said frame having an upper portion and a lower end portion positionable closest to the earth;

said hydraulic motor means connected to said plates of said frame, said hydraulic motor means fluidly connected to and controlled by said hydraulic system means, said hydraulic motor means removably connected to said hydraulic system; and said circular saw blade having a peripheral cutting edge, said circular saw blade being coupled to and rotated by said hydraulic motor means, said frame supporting said circular saw blade for generally vertical rotation in relation to the earth for cutting fallen timbers on the ground as said frame moves from said first position above the earth to said second position in at least close proximity to the earth supporting the timber, said circular saw blade being so supported by said frame that a lower portion of said peripheral cutting edge of said circular saw blade extends below said lower end portion of said frame, said circular saw blade is always disposed in a generally vertical position to the ground;

a bracket means for moving timbers extending outward from said guard cover;

said plates of said frame means includes a side panel positioned a distance away from said circular saw blade by an operable amount and said hydraulic motor means is positioned between said plates.

* * * * *